United States Patent Office 2,963,772
Patented Dec. 13, 1960

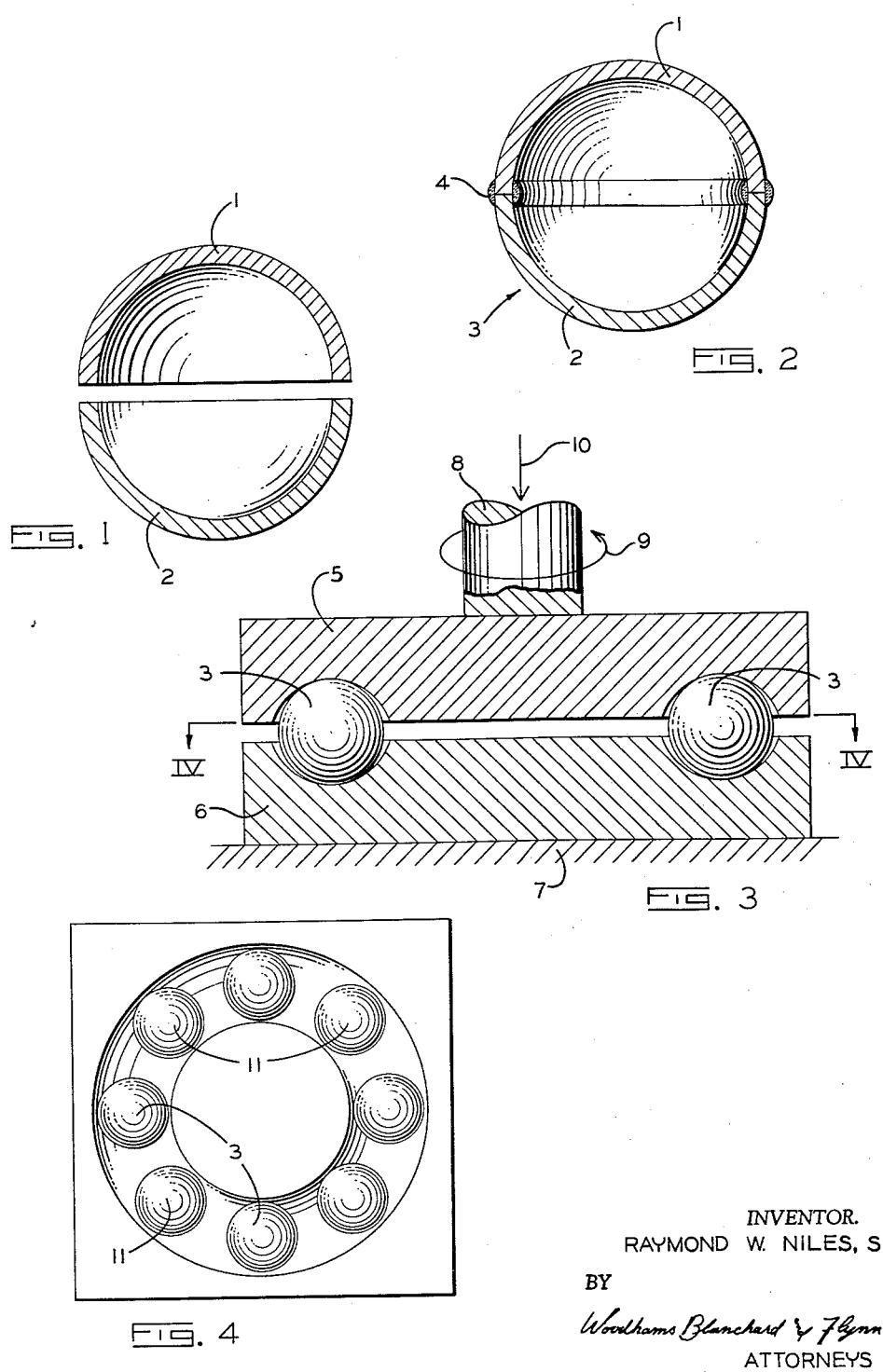

2,963,772

METHOD OF MAKING BALLS

Raymond W. Niles, Sr., Ann Arbor, Mich., assignor to Industrial Tectonics, Inc., Ann Arbor, Mich., a corporation of Michigan Filed July 23, 1958, Ser. No. 750,395

3 Claims. (Cl. 29—148.4)

This invention relates to a method of making relatively large, hollow metal balls and it relates particularly to a method of making large, hollow metal balls with relatively thick walls.

One conventional method for making relatively large hollow metal balls involves the forming by any convenient process, such as forging, of hemispherical sections of the desired inside and outside radii, welding such sections together and then, if necessary, grinding the external surface of the ball adjacent the weld zone to a smooth finish. This is satisfactory where the wall thickness of the ball is relatively thin, such as of $\frac{1}{16}$ to $\frac{1}{8}$ inch for a ball of approximately two to four inches in diameter, but it is not suitable where the wall thickness is materially larger, such as a wall thickness of $\frac{1}{2}$ inch for a ball of the same diameter. This is for the reason, among others, that the welding operation does not proceed uniformly where the sections are too thick to be properly and uniformly heated. More specifically, where a pair of hemispheres having relatively thick walls are welded together, there is likely to be considerable distortion of the hemispheres so that the ball product is non-spherical to an undesirable or unacceptable degree. If an attempt is made to make the ball product spherical by a suitable method, such as grinding, the walls of the ball product will be of uneven thickness since the inside diameter of the ball will remain non-uniform.

Other sources of distortion which are experienced in connection with the fabrication of relatively thick-walled balls involve the necessity of repeated applications of welding metal with the resultant inclusion of scale and/or voids in the weld metal, distortion arising from irregularities in the original forging of the hemispheres and discontinuous physical characteristic due to the mass of weld metal adjacent and between the respective metallic hemispheres. Further, it is impossible to do any work on the inside of the ball after the welding operation is completed and, hence, if it is not of uniform inside radius before the welding operation is begun or if the inside radius becomes non-uniform during or after the welding operation there is no way available of correcting this situation.

Therefore, in the past, the fabrication of hollow metallic balls having relatively thick wall thicknesses has been an extremely difficult operation and such balls have either been expensive or not particularly satisfactory.

Accordingly, among the objects of the invention are:

(1) To provide an improved process for forming hollow metallic balls of relatively large wall thickness.

(2) To provide a process, as aforesaid, in which work can be carried out on the inside of the ball after the hemispherical halves thereof have been welded together whereby the inside surface may be rendered substantially spherical.

(3) To provide a process, as aforesaid, by which hollow metal balls of relatively large wall thickness may be fabricated to have a high degree of both static and dynamic balance.

(4) To provide a process, as aforesaid, by which balls of exactly predetermined specific weight may be made.

(5) To provide a process, as aforesaid, by which hollow balls having a highly refined internal structure and a work hardened external surface may be fabricated.

(6) To provide a process, as aforesaid, which can be carried out using techniques which are in part substantially similar to those already known to the art.

(7) To provide a process, as aforesaid, which includes a welding operation and wherein such welding operation is not greatly different from welding operations presently known for processes of this general type.

(8) To provide a process, as aforesaid, which is useful for fabricating balls of a wide variety of sizes and wall thicknesses and in which the equipment required to carry out the process can be readily applied to form balls of varying sizes and of varying wall thickness.

(9) To provide a process, as aforesaid, which will produce balls of much superior characteristics, particularly as regards strength, sphericity and appearance than balls formed by previous processes.

(10) To provide a process which can be carried out rapidly and efficiently and at relatively small cost.

Other objects and purposes of the invention will be apparent to persons acquainted with processes of this general type upon reading the following disclosure and inspecting the accompanying drawings.

In the drawings:

Figure 1 is a central sectional view through a pair of hemispherical blanks from which a ball is to be made.

Figure 2 is a central sectional view showing the two hemispherical blanks illustrated in Figure 1 welded together.

Figure 3 is a schematic sectional view through an apparatus for working on the balls after welding thereof is completed.

Figure 4 is a sectional view taken on the line IV—IV of Figure 3.

In general, the invention consists essentially of welding together two hemispherical sections to form a hollow ball of somewhat larger diameter and lesser wall thickness than that desired in the final product and subsequently rolling said ball between suitable means under a substantial pressure and thereby simultaneously reducing the diameter and increasing the wall thickness of said ball until such diameter and wall thickness reach the desired values.

More particularly, the invention may be illustrated by reference to the drawings wherein one particular manner of practicing same is illustrated. It will be understood, however, that reference to particular details of practicing the invention and particular equipment for same is solely for the purpose of illustrating the principles of the invention and in no sense imports any limitations thereto.

In Figure 1 there is illustrated a pair of hemispherical blanks 1 and 2, both thereof being of an outside radius of a value somewhat larger than that desired for the final ball product and being of a wall thickness somewhat less than that desired for the final product. For example, and only by way of example and not limitation, a blank having an outside radius of 1½ inches and having an 0.100 inch wall thickness will produce a finished ball having a 1 inch outside radius and approximately an 0.283 inch wall thickness. Further, a blank having a 1½ inches outside radius and an 0.150 inch wall thickness will produce a finished ball of 1 inch outside radius and a wall thickness of approximately 0.559 inch.

The blanks 1 and 2 are then welded together in any convenient manner, herein shown as butt welding, to form a welded ball indicated at 3 in Figure 2. While any suitable welding procedure may be utilized for this purpose, the commercial process known as heliarc welding is particularly advantageous because it does not require the utilization of separate weld metal, which metal might otherwise form a discontinuity in the finished product. The weld flashing 4, if any, may, if desired, be ground off at this time so that there is provided a smooth ball of the original diameter and the original wall thickness.

The ball is then placed between compression means which may preferably be a pair of plates 5 and 6. In a typical installation, one plate 6 will be fixed to any suitable base schematically indicated at 7 and the other plate 5 will be affixed to any suitable means 8 for providing both a substantial urging of said plate 5 toward the plate 6 indicated by arrow 10 and a rotary motion in a plane parallel to the plane of the plate 6, said rotary motion being indicated by the circularly arranged arrow 9. Since there are many mechanisms well-known to the industry for providing such simultaneously applied pressure and laterally directed circulatory motion, it is unnecessary to further describe mechanism for this purpose herein.

A plurality of balls 3 are placed between the plates 5 and 6 in suitable grooves therein. A further plurality of solid balls 11 are positioned between plates 5 and 6 interspersed with the hollow balls 3 and are herein shown as being alternately arranged therewith. The solid balls 11 act as spacers between the plates 5 and 6 in order to insure that said plates will not merely flatten the hollow balls 3 into an ellipsoidal shape but will uniformly reduce the diameter thereof. The balls 11 are of slightly lesser diameter than the outside radius of balls 3. Plate 5 is then rotated and an axial force is applied thereto so that the hollow balls are rolled under substantial pressure and the metal thereof caused thereby to flow radially inwardly to thereby form a ball of smaller diameter and consequently of greater wall thickness, the external diameter of the hollow balls becoming substantially equal to the diameter of the solid balls 11. The balls 11 are then replaced with similar solid balls of smaller diameter and the plate 5 is rotated and an axial pressure applied thereto to further reduce the external diameter of balls 3. The balls 3 are rolled with balls 11 of successively smaller diameter until the diameter of the balls 3 has reached the desired value.

It will be recognized that the rolling motion effects sufficient cold working of the metal of the balls 3 as to give them extremely good strength and grain characteristics and the relative circular motion provided by the parallel arranged plates 5 and 6 insures that the balls 3 will have good sphericity.

While the use of the incompressible balls 11 is preferred for the practice of the invention, it has been found that incompressible spacing blocks or rigid stops may be interposed between the plates 5 and 6 in place of said incompressible balls to limit movement of said plates toward each other with almost as satisfactory results as are attained in the preferred embodiment of the invention. The spacing between the plates 5 and 6 at the end of a rolling operation may be progressively reduced by substituting blocks of lesser thickness or adjusting the position of the stops.

Numerous tests have established clearly that the ball products of the above described process will be of good sphericity and will be of substantially uniform wall thickness in all portions thereof even though the original hemispherical sections from which the ball product is made are of somewhat less satisfactory sphericity providing only that the hemispherical sections are of substantially uniform wall thickness. Further, these tests have established that even where the welding of the hemispheres together produces an intermediate product of relatively poor sphericity the rolling operation above described will improve the sphericity of the resulting ball and will do so with respect to both its inside and its outside diameter. Thus, the resulting hollow ball is of good sphericity both inside and outside and of uniform wall thickness so that it will have good static balance as well as good dynamic balance and will in all respects be of high quality.

While particular steps and particular apparatus have been referred to herein for a description of a particular method of practicing the invention, it will be recognized that both the particular steps and the apparatus used may be varied widely within the scope of the invention and, accordingly, the hereinafter appended claims will be construed to include such variations excepting as said claims may by their own terms expressly provide otherwise.

I claim:

1. In a process for making relatively thick-walled, hollow balls, the steps comprising: welding together two hemispherical sections of uniform wall thickness and of larger external diameter and lesser wall thickness than that desired for the ball product to form a hollow ball; placing a plurality of such balls between a pair of relatively rotatable members which are movable toward each other; providing spacing means between said members for preventing movement of said members toward each other when same are spaced a predetermined minimum distance apart, said members being initially spaced a greater distance than said predetermined distance; rotating said members relative to each other and simultaneously urging said members toward each other to simultaneously roll said hollow balls and compress same until said spacing means prevent further movement of said members toward each other whereby said hollow balls become of smaller diameter and greater wall thickness.

2. In a process for making relatively thick-walled, hollow balls, the steps comprising: welding together two hemispherical sections of uniform wall thickness and of larger external diameter and lesser wall thickness than that desired for the ball product to form a hollow ball; placing a plurality of such balls together with a plurality of substantially incompressible balls of smaller diameter between a pair of relatively rotatable members; rotating said members relative to each other and simultaneously urging said members toward each other to simultaneously roll said hollow balls and compress same until said hollow balls are of substantially the same diameter as said incompressible balls whereby said hollow balls become of smaller diameter and greater wall thickness.

3. A process according to claim 2 including the steps of replacing said incompressible balls between said members with a further plurality of incompressible balls of smaller diameter and then rotating said members relative to each other and urging said members toward each other to further reduce the diameter and increase the wall thickness of said hollow balls; and repeating the above steps with progressively smaller incompressible balls until the hollow balls attain the desired characteristics.

References Cited in the file of this patent

UNITED STATES PATENTS

| | | |
|---|---|---|
| 1,278,915 | Gruver | Sept. 17, 1918 |
| 1,514,810 | Wisch | Nov. 11, 1924 |
| 1,526,140 | Gruver | Feb. 10, 1925 |
| 1,587,404 | Nicholson | June 1, 1926 |
| 2,177,928 | Knudsen | Oct. 31, 1939 |
| 2,682,700 | Simoneau | July 6, 1954 |